United States Patent [19]

Nishiyama

[11] Patent Number: 4,712,188

[45] Date of Patent: Dec. 8, 1987

[54] PATTERN OUTPUT APPARATUS

[75] Inventor: Masaki Nishiyama, Tokyo, Japan

[73] Assignee: Canon Kabushiki Kaisha, Tokyo, Japan

[21] Appl. No.: 696,052

[22] Filed: Jan. 29, 1985

[30] Foreign Application Priority Data

Jan. 31, 1984 [JP] Japan .................................. 59-14296

[51] Int. Cl.[4] ................................................ G06F 3/14

[52] U.S. Cl. ...................................... 364/900; 340/750

[58] Field of Search ................ 364/900 MS File, 518, 364/519, 520, 521; 340/721, 750

[56] References Cited

U.S. PATENT DOCUMENTS 4,234,931 11/1980 Kanaiwa et al. .................... 364/900

*Primary Examiner*—Raulfe B. Zache

*Attorney, Agent, or Firm*—Fitzpatrick, Cella, Harper & Scinto

[57] ABSTRACT

There is provided a pattern output apparatus to particularly output a dot pattern for use in a typewriter, word processor, computer, etc. This apparatus comprises: a memory in which a plurality of pattern information are stored; a read device for reading out the corresponding pattern information from the memory in accordance with an input code; a decision device for discriminating the state of the pattern information read out by the read device; and a device for forming a new code from the pattern information on the basis of the result of discrimination by the decision device. The portions of the codes which were not used so far for the purpose of the output of patterns in the code system consisting of a limited number of bits are used to output the patterns, so that a number of kinds of patterns stored efficiently in a code table can be efficiently outputted.

10 Claims, 8 Drawing Figures

FIG. 2

| UPPER / LOWER | 0 | 1 | 2 | 3 | 4 | 5 | 6 | 7 |
|---|---|---|---|---|---|---|---|---|
| 0 | | DE | | 0 | @ | P | ` | P |
| 1 | SH | D1 | ! | 1 | A | Q | a | q |
| 2 | SX | D2 | " | 2 | B | R | b | r |
| 3 | EX | D3 | # | 3 | C | S | c | s |
| 4 | ET | D4 | $ | 4 | D | T | d | t |
| 5 | EQ | NK | % | 5 | E | U | e | u |
| 6 | AK | SN | & | 6 | F | V | f | v |
| 7 | BL | EB | ' | 7 | G | W | g | w |
| 8 | BS | CN | ( | 8 | H | X | h | x |
| 9 | HT | EM | ) | 9 | I | Y | i | y |
| A | LF | SB | * | : | J | Z | j | z |
| B | HM | EC | + | ; | K | [ | k | { |
| C | CL | → | , | < | L | ¥ | \| | ¦ |
| D | CR | ← | − | = | M | ] | m | } |
| E | SO | \| | . | > | N | ^ | n | ‾ |
| F | SI | \| | / | ? | O | _ | o | DL |

FIG. 4

| b3 | b2 | b1 | b0 | b1 | 0 | 0 | 0 | 0 | 0 | 0 | 0 | 0 |
|---|---|---|---|---|---|---|---|---|---|---|---|---|
| | | | | b2 | 0 | 0 | 0 | 0 | 1 | 1 | 1 | 1 |
| | | | | b3 | 0 | 0 | 1 | 1 | 0 | 0 | 1 | 1 |
| | | | | b4 | 0 | 1 | 0 | 1 | 0 | 1 | 0 | 1 |
| | | | | | 0 | 1 | 2 | 3 | 4 | 5 | 6 | 7 |
| 0 | 0 | 0 | 0 | 0 | # | ^ | SP | 0 | ③ | P | ⑧ | p |
| 0 | 0 | 0 | 1 | 1 | < | , | ! | 1 | A | Q | a | q |
| 0 | 0 | 1 | 0 | 2 | > | ~ | " | 2 | B | R | b | r |
| 0 | 0 | 1 | 1 | 3 | @ | Ñ | ⓪ | 3 | C | S | c | s |
| 0 | 1 | 0 | 0 | 4 | [ | ñ | $ | 4 | D | T | d | t |
| 0 | 1 | 0 | 1 | 5 | \ | ¿ | % | 5 | E | U | e | u |
| 0 | 1 | 1 | 0 | 6 | ] | ¢ | & | 6 | F | V | f | v |
| 0 | 1 | 1 | 1 | 7 | { | | ' | 7 | G | W | g | w |
| 1 | 0 | 0 | 0 | 8 | \| | § | ( | 8 | H | X | h | x |
| 1 | 0 | 0 | 1 | 9 | } | ò | ) | 9 | I | Y | i | y |
| 1 | 0 | 1 | 0 | A | ù | à | * | : | J | Z | j | z |
| 1 | 0 | 1 | 1 | B | Ä | ä | + | ; | K | ④ | k | ⑨ |
| 1 | 1 | 0 | 0 | C | é | è | / | ① | L | ⑤ | l | ⑩ |
| 1 | 1 | 0 | 1 | D | Ö | ö | − | = | M | ⑥ | m | ⑪ |
| 1 | 1 | 1 | 0 | E | Ü | ü | · | ② | N | ⑦ | n | ⑫ |
| 1 | 1 | 1 | 1 | F | Å | å | / | ? | O | — | o | DEL |

FIG. 6

OOH — CONTENT OF RELATIVE ADDRESS OF FONT OFH → OCH

DIP SWITCH: OOH → ODH

| | 0 | 1 | 2 | 3 | 4 | 5 | 6 | 7 | 8 | 9 | 10 | 11 | 12 |
|---|---|---|---|---|---|---|---|---|---|---|---|---|---|
| NORWAY DENMARK | ∠ | ≮ | > | ´ DK | Æ | ϕ | Å | ^ DK | ` DK | æ | ϕ | å | ¨ DK |
| NETHERLANDS | # | < | > | \| | ´ DK | ¨ DK | ` DK | ^ DK | ° | f | ± | ½ | ~ |
| SOUTH AFRICA | \| | x2 | x3 | @ | ´ DK | ¨ DK | ` DK | ^ DK | ° | 'n | ℓ | ½ | ÷ |
| LATIN | # | Bs | B/o | \| | Ñ | i | ´ DK | ^ DK | ‖ | ñ | ¿ | ª | º |
| SPAIN | \| | ª | º | ´ DK | Ñ | i | Ç | ^ DK | ¨ DK | ñ | ¿ | Ç | ` DK |
| SWEDEN | ∠ | < | > | ´ DK | Ä | Ö | Å | ^ DK | ` DK | ä | ö | å | ü |
| U.S.A. | # | 2 | 3 | @ | [ | ± | ] | ° | ¢ | ¼ | \| | ½ | = |
| U.K. | ∠ | ¼ | ¾ | @ | [ | ½ | ] | ° | ⅛ | ⅜ | \| | ⅝ | ⅞ |
| W. GERMANY | # | ´ DK | ` DK | § | Ä | Ö | Ü | ° | \| | ä | ö | ü | β |
| ITALY | ∠ | \| | ½ | § | ° | Ç | é | ^ DK | ù | à | ò | è | ì |
| FRANCE | ∠ | 2 | 3 | à | ° | Ç | § | ^ DK | \| | è | ù | è | ¨ DK |
| SWITZERLAND | ∠ | ´ DK | ` DK | ù | é | è | à | ^ DK | \| | ä | ö | ü | ¨ DK |
| JAPAN | # | ° | = | @ | ´ DK | ¨ DK | ` DK | ^ DK | ¥ | § | \| | Ç | β |
| CANADA | # | ½ | ¼ | ^ DK | ´ DK | ¨ DK | ` DK | ^ DK | ` DK | è | \| | ¨ | Ç |

PATTERN OUTPUT APPARATUS

BACKGROUND OF THE INVENTION

1. Field of the Invention

The present invention relates to an output apparatus for use in a word processor such as a typewriter or the like or in a computer or the like and, more particularly, to a pattern output apparatus for outputting patterns based on a dot representing system.

2. Description of the Prior Art

Various kinds of output apparatuses have been developed as output apparatuses of various equipment. Recently, a pattern output apparatus based on the dot representing system has come into wide use. This is because it can extremely easily form a number of kinds of pattern outputs. For example as such an apparatus, a CRT display of the dot refresh type, wire dot printer, thermal printer, etc. can be mentioned. In the CRT display of the dot refresh type, in general, a pattern of a character or symbol (hereinbelow, referred to as a font) is accessed by a code and the font read out is temporarily stored in a video RAM, then this font is repeatedly read out at a high speed and is displayed on the CRT.

FIG. 2 is a diagram showing the correspondence between the ASCII codes which are generally frequently used and the patterns of characters or patterns. To apply this relation to the pattern output apparatus of the dot representing system, all fonts each having a size of 8×16 bits, for instance, are preliminarily stored in a memory such as a ROM or the like. When one desires to display font "A" among those fonts, the actual readout address in the ROM is obtained by way of (reference address in the ROM)+(16 ×41H) since the code of font "A" corresponds to 41 H (H denotes a hexadecimal notation and the same shall apply hereinafter). Then, font "A" as much as sixteen bytes is read out from the ROM and is displayed.

However, in the conventional pattern output apparatus using the foregoing method, as shown in FIG. 2 also, when the input code lies within a range of 00H to 1FH, a predetermined control is executed in accordance with the code or the like. There is no application to the control whereby some fonts are made coordinate with the codes in this range and these fonts are merely outputted. Therefore, in the foregoing ASCII codes, thirty-two kinds of codes among the 128 kinds of codes cannot be used to output the patterns, so that the remaining ninety-six kinds of codes are made coordinate with the fonts. Thus, the number of kinds of output characters is limited and this method itself is insufficient for the application to output a number of kinds of fonts.

SUMMARY OF THE INVENTION

In consideration of the foregoing points, the present invention eliminates the above-mentioned drawbacks.

Thus, according to one aspect of the present invention, there is provided a pattern output apparatus is provided in which the portions of the codes which were not used so far for the purpose of the output of patterns in a pattern output apparatus are used to output patterns, thereby enabling a number of kinds of patterns stored efficiently to be outputted efficiently.

According to still another aspect of the invention, a pattern output apparatus is provided in which a simple arrangement such as to enable an arbitrary combination of a code and a pattern (font) to be selectively used is added in the code system consisting of a limited number of bits, thereby making it possible to efficiently and selectively output combinations of a number of kinds of patterns on the basis of a number of kinds of code systems in accordance with an object of use.

The invention also includes an output apparatus which newly generates a code in dependence upon the state of the pattern information which is obtained in correspondence to the input code, thereby enabling the pattern information to be newly outputted.

Switch means may be provided to extend the code system and to process special characters for every country.

BRIEF DESCRIPTION OF THE DRAWINGS

FIG. 2 is a diagram showing the correspondence between the ASCII codes and characters or symbols;

FIG. 4 is a diagram showing code systems which are used in the display of the embodiment;

FIG. 6 is a diagram showing a code table to process the special characters in FIG. 4.

DETAILED DESCRIPTION OF THE PREFERRED EMBODIMENTS

Figure 1:
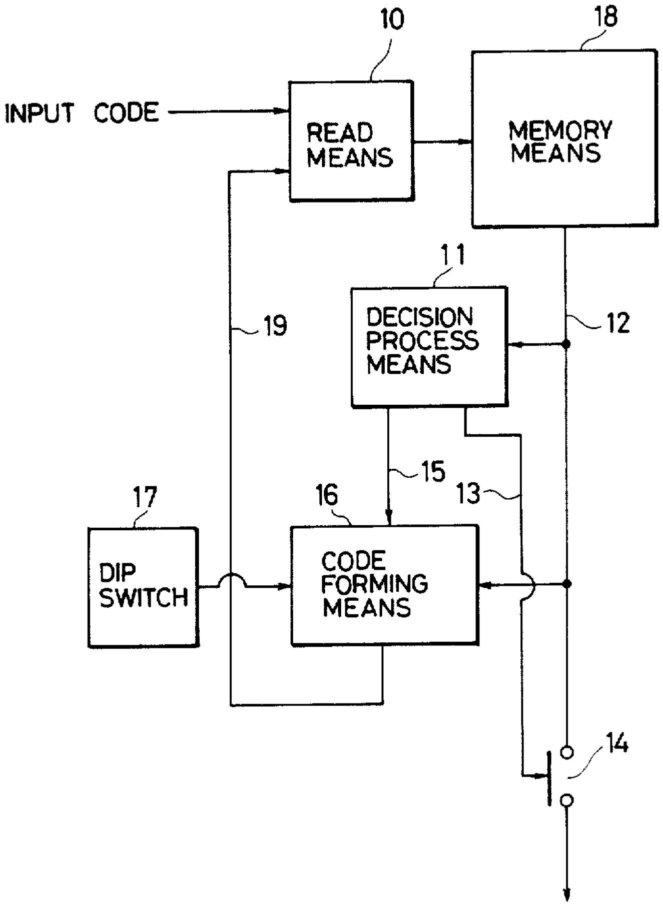
FIG. 1 is a block diagram showing a functional arrangement of an example to accomplish the foregoing objects of the present invention.

FIG. 1 shows a block diagram of one embodiment of the present invention. In the diagram, read means 10 reads out corresponding pattern information from memory means 18, in which a plurality of pattern information have been stored, in accordance with an input code. Decision process means 11 determines, for instance, the on/off of the bit which was first read out with respect to the pattern information read out on a line 12. If the bit is determined to be off, switching means 14 is closed through a line 13, thereby allowing the pattern information read out to be effectively used as it is. On the contrary, if the bit is determined to be on, code forming means 16 is energized through a line 15. The code forming means 16 forms a new code from the information necessary to form a new code included in the pattern information read out and from predetermined information which is derived through a dip switch 17. Then, the code forming means 16 outputs the new code onto a line 19. The read means 10 reads out the pattern information corresponding to the new code from the memory means 18.

Figure 3:
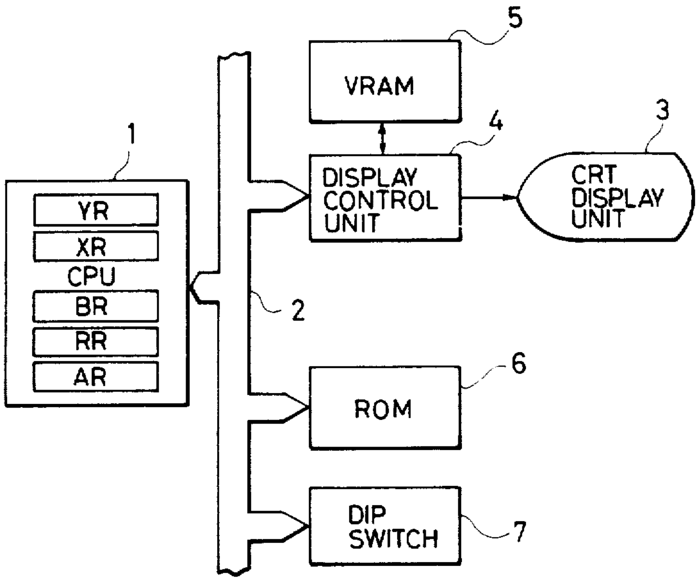
FIG. 3 is a block diagram showing a main functional arrangement of a display of one embodiment according to the invention.
Figure 7:
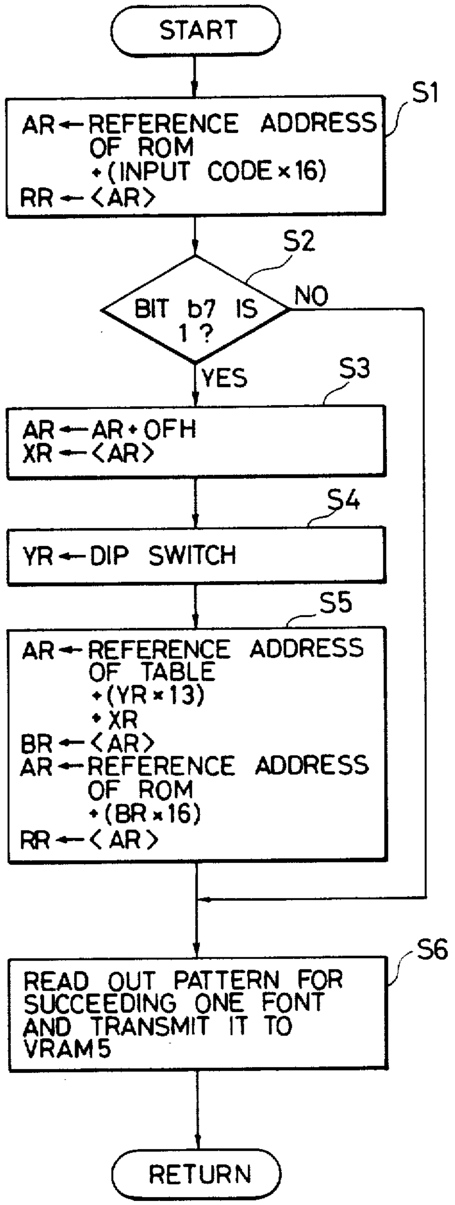
FIG. 7 is a flow chart for explaining the operation of the arrangement shown in FIG. 3.

The function of a CRT display of the dot refresh type of one embodiment according to the present invention will then be described with reference to FIG. 3. In FIG. 3, a reference numeral 1 denotes a central processing unit (CPU) for executing the main control of the display in accordance with a built-in program as shown in FIG. 7; 2 is a common bus of the CPU 1; 3 a CRT display unit of the raster scanning display system; 4 a display control unit for outputting the pattern information of the dot refresh system to the CRT display unit 3; 5 a video RAM (VRAM) which stores the display dot patterns as much as one display screen of the CRT and can repeatedly read them out at a high speed; 6 a ROM in which the corresponding font information has been stored in accordance with the code systems of one example according to the present invention; and 7 a dip switch for giving the information to extend the code system consisting of a limited number of bits such that it can be used in the different code systems in dependence upon respective countries. The operation in the above arrangement will then be described in detail hereinbelow.

FIG. 4 is a diagram showing the code systems which are used in the display of the embodiment. In the diagram, the upper four bits of the code indicate the 0th to 7th columns, while the lower four bits denote the 0th to F-th rows. The pattern of the font which is read out on the basis of the address information stored in the cross point of the column and row is shown at this cross point. Such information in the table has been stored in the main memory equipped in the CPU 1.

Figure 5A:
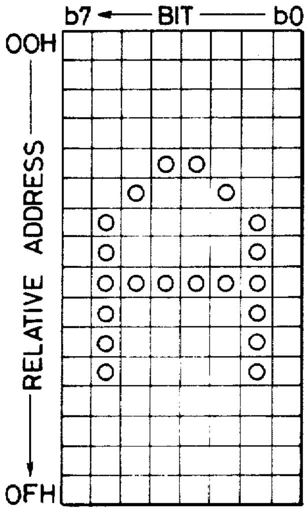
FIGS. 5A and 5B are diagrams showing typical examples of the font data stored in a ROM.
Figure 5B:
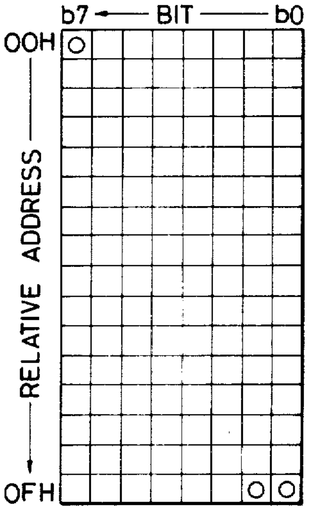

FIGS. 5A and 5B are diagrams showing typical examples of the font data stored in the ROM 6. In the diagrams, one font is constituted by a memory as much as sixteen bytes and the relation between the relative address and the significance of the bit is as shown in the diagrams. Therefore, when one desires to display font "A", the code 41H is first inputted and then the CPU 1 calculates (reference address in the ROM 6)+(16×41H) to obtain the reference address of font "A" as shown in FIG. 5A. The CPU 1 accesses the ROM 6 by the reference address thus obtained and subsequently reads out the font data as many as sixteen bytes and transfers the font data read out to the VRAM 5 through the display control unit 4. In this way, it is possible to freely access the fonts of "0 to 10", "A to Z", "a to z", etc. and to display the corresponding characters or symbols in the CRT display unit 3 in a manner similar to the conventional one.

The display of the embodiment can directly display the other fonts than those fonts in a similar manner. For instance, when the CPU 1 accesses in accordance with a code 0BH, font "A" corresponding to this code is displayed. Conventionally, the display could not be performed for the code in this portion. For instance, it corresponds to a control code HM in FIG. 2. Even in the display of the embodiment as well, when the code in this portion is inputted, this code is regarded as the control code. Therefore, in case of receiving or transmitting data with an apparatus which operates on the basis of other ASCII codes, for example, it is impossible to transmit a code 06H in FIG. 4 as it is to another apparatus and to display font "]". Since "06H" generally indicates "AK", such an ordinary communicating procedure is processed as an inherent communication control signal "AK". However, it is possible to convert the new information formed by the special process in the display of the embodiment or the code information transmitted in the special code format (e.g., code with a shift, or the like) from another apparatus to the code 06H in the display of the embodiment and to directly display font "]" by this code. As described above, in the display of the embodiment, with respect to the ordinary characters or symbols in one code system consisting of a limited number of bits, the codes and font memories can be efficiently used in a conventional manner. On the other hand, with regard to the portions of the codes which were not used so far, e.g., the portion of the control code, an effective font is made coordinate with this code, thereby enabling the code and font memory to be efficiently used.

Next, in FIG. 4, when the CPU 1 accesses the fonts in the ROM 6 in accordance with the codes corresponding to symbols (0) to (12), the data of the bit pattern as shown in FIG. 5B has been stored therein. The data stored therein is processed as the information instead of the font and only the information in relative addresses 00H and 0FH in the diagram has the meanings. Practically speaking, when the highest significant bit b7 of the relative address 00H is 1, it is indicated that the bit pattern at the relative address 0FH in this font area should be processed as the information instead of the font. On the other hand, when the highest significant bit b7 is 0, it is indicated that the bit pattern in this font area can be used as it is as the font. Therefore, when the pattern as shown in FIG. 5A is accessed, font "A" read out is used as it is. When the pattern as shown in FIG. 5B is accessed, the information at the relative address 0FH is used in a form such as to cause a new code. Namely, even when the CPU 1 accesses any font, it examines the on/off of the highest significant bit b7 at the relative address 00H. If the bit b7 is 1, the CPU 1 executes the process to form a further new font address. As described above, the bit b7 is used as a flag bit to determine the execution of what is called the indirect access.

FIG. 7 is a flow chart showing in detail the process for the foregoing indirect access or the access of the font which is executed by the CPU 1. In step S1, the font address in the ROM 6 corresponding to the input code is formed with respect to an address register AR in the CPU 1 and the content read out from the head address is loaded into a register RR. In step S2, a check is made to see if the highest significant bit b7 in the register RR is 1 or not. Unless it is 1, step S6 follows and the font data as much as the succeeding one font is read out as mentioned before and is transferred to the VRAM 5. On the other hand, when the bit b7 is 1, the indirect accessing process in and after step S3 is performed. In step S3, the content at the relative address 0FH is added to the content of the address register AR, then the content at the final address of the relevant font data is loaded into a register XR. In step S4, the content of the dip switch 7 is loaded into a register YR. The dip switch 7 is provided in order to extend the code system in the display of the embodiment. In general, characters "A to Z", numerals "0 to 9", etc. are accessed by the codes which are common in each country. However, with respect the other special characters such as, e.g., "<", ">", etc., the code systems differ in dependence upon the respective countries. In addition, in some countries, the symbols which are peculiar to the countries are freely used. Therefore, for such a number of kinds of code systems, it is demanded for the pattern output apparatus as well to efficiently cope with them with an extremely simple arrangement. In the display of the embodiment, a code table provided to process the special characters for every country is included in the memory of the CPU1.

FIG. 6 is a diagram showing the above-mentioned code table to process the special characters for every country. In the table, the special characters which differ for every country are shown in each row. The dip switch 7 outputs the information to select an arbitrary one of the countries. For instance, when a value of the dip switch 7 is set to 0CH, the code system of the special characters for Japan is selected and this code system is combined with the code systems of characters "A to Z", numerals "0 to 9", etc. in the portions which are common to each country.

FIG. 6 will now be further described. Columns (0) to (12) in FIG. 6 correspond to the contents stored at the relative address 0FH of FIG. 5B. For instance, in case of (2) it corresponds to "00000010". Therefore, when the CPU 1 allows symbol "#" to be displayed in the code system for Japan, a code 23H may be inputted by referring to the code table in FIG. 4. Namely, (0) is selected and data 00H is always loaded at the relative address 0FH of the font data which is accessed by the code 23H. This indicates the (0)-th column in FIG. 6. In addition, the content of the dip switch 7 denotes Japan, so that it is set to 0CH. Thus, in FIG. 6, the new code responsive to the font "#" is loaded at the location corresponding to the cross point of the matrix of the special code table since the column is (0) and the row is 0CH. This code corresponds to 00H from FIG. 4.

Returning again to the flow chart in FIG. 7, the foregoing process is shown in step S5. Namely, for the address register AR, a new address is formed by adding the content (representing the selection of the row) of which the content of the register YR was increased by thirteen times and the content (indicative of the offset of the column) of the register XR to the reference address in the special code table shown in FIG. 6. Next, a new code read out from the special code table by that new address is loaded into a register BR. Subsequently, the address of a new font is formed in the address register AR in accordance with the code in the register BR in a similar manner as in step S1. Then, the first font data of the font indicated by the address register AR is loaded into the register RR. The font of the desired special character has been stored in this register RR. In step S6, the font data for succeeding one font is read out and is transmitted to the VRAM 5.

The invention will now be further explained with respect to another example. In the case where the input code is 51H, (reference address in the ROM)+(51H ×16) is calculated in step S1 in FIG. 7 and the font address in the ROM 6 corresponding to the input code is formed, then the content read out from the head address is loaded into the register RR. A check is made to see if the highest significant bit b7 in the register RR is 1 or not in step 2. In this case, since it is an ordinary font pattern, step S6 follows and the pattern for one font is read out and is transmitted to the VRAM 5.

On one hand, when the input code is 5CH, the content for the font address in the ROM 6 is not an ordinary font pattern, so that the answer in step S2 is YES. As will be obvious from FIG. 4, the content corresponding to the input code 5CH is (5), so that 05H is loaded into the relative address 0FH in step S3. Next in step S4, the value of the dip switch, for instance, in case of 08H, the value corresponding to 08H is loaded in the register YR. Then in step S5, a new code is formed, namely, "ö" is selected on the basis of "W. Germany" and (5) in FIG. 6 due to the value of the dip switch and is transmitted to the VRAM 5 in step S6.

As described above, in the display of the embodiment, the font data such as to form the codes of (0) to (12) in FIG. 4 is preliminarily stored in the font areas, and the additional information which is formed by the dip switch 7 is combined with that font data, thereby making it possible to extend the kind of code system which can be accessed to any number of kinds. Obviously, the number of kinds of special fonts can be also increased. Therefore, even in the code system consisting of seven bits, the number of kinds of fonts which can be accessed can be extended to more than 128. It is rather a feature in the arrangement of symbols shown in FIG. 4 that, as shown in FIG. 6, all of the special characters and symbols which are used for every country are listed up and almost of the common fonts are included in the first and second columns in the code systems in FIG. 4. Consequently, a number of kinds of fonts as many as possible are efficiently arranged in the font areas which can be read out by one code system as shown in FIG. 4. Further, the table means having the codes of a plurality of systems as shown in FIG. 6 is also used. Therefore, a plurality of kinds of code systems substantially exist in the table of FIG. 4.

It will be easily understood that, as an example of an application of the foregoing contents, the display process such as superscript, subscript, or the like can be easily realized on the basis of the results of discriminations regarding on/off of a predetermined number of bits of the pattern information read out from the memory means. For instance, in a display having a video RAM as much as one display screen, the font can be offset-transmitted at an arbitrary location in the video RAM. Therefore, the invention can be also used for an application such that the offset display location of the corresponding font pattern is controlled due to the process based on the results of discriminations of on/off of a predetermined number of bits.

As described above, according to the present invention, it is possible to provide a pattern output apparatus in which the portions of the codes which were not used for the purpose of the output of fonts so far in the code system consisting of a limited number of bits are used to output the fonts, thereby enabling a number of kinds of fonts to be efficiently outputted. Therefore, even in case of what is called a control code, the user can not only execute this control code but also pattern and see the control code for confirmation if it is irrespective of the display. In addition, the information which is caused in a special form or is transmitted can be easily converted to the special font and outputted.

On the other hand, according to the present invention, it is possible to provide a pattern output apparatus in which a simple arrangement such that arbitrary combinations of codes and fonts can be selectivelY used in the code system consisting of a limited number of bits is added, thereby making it possible to efficiently and selectively output the combinations of a number of kinds of fonts based on a number of kinds of code systems in accordance with an object of use. Therefore, even if the methods of using the special characters differ in every country, for instance, the user can extremely easily cope with such a situation owing to the efficient arrangement of fonts in which a plurality of kinds of code systems are arranged all together.

What is claimed is:

1. A pattern output apparatus comprising:

memory means for storing a plurality of pattern information;

input means for inputting code information to said apparatus;

read means connected to said memory means and to said input means for reading out said pattern information corresponding to said code information, from said memory means;

decision means connected to said memory means for discriminating a bit data within said pattern information read out by said read means to produce a discrimination result and for outputting said discrimination result; and code information output output means connected to said memory means and to said decision means for generating, in response to said discriminatiaon result, generated code information indicating that pattern information different from said read out pattern information should be read out from said memory means, wherein said generated code information is output to said read means.

2. A pattern output apparatus according to claim 1, wherein said code information output means comprises code information output means for storing pattern information corresponding to said bit data within said pattern information.

3. A pattern output apparatus according to claim 1, further comprising means for inputting a country-designating-data designating pattern information for each country into said apparatus, wherein said code information output means comprises country-code-information memory means for storing country-code-information corresponding to pattern information for each country, and wherein said country-code-information is read out from said contry-code-information memory means in response to said discrimination result and said country-designating-data designating pattern information input by said contry-designating-data designating pattern input means.

4. A pattern output apparatus according to claim 1, further comprising display means for displaying said pattern information as an image pattern.

5. A pattern output apparatus according to claim 3, wherein said country-designating-data designating pattern input means comprises a dip switch.

6. A pattern output apparatus comprising:

memory means for storing a plurality of pattern information;

display means for displaying said pattern information as an image data;

input means for inputting code information to said apparatus;

read means connected to said memory means and said input means for reading out said pattern information corresponding to said code information, from said memory means;

decision means connected to said memory means for discriminating a flag bit within said pattern information read out by said read means in order to decide which one of character code information and control code information said code information belongs to;

switch means connected to said memory means and to said decision means for directly outputting said pattern information to said display means in order to display a character pattern when said decision means has decided that said code information belongs to said character code information, and for cutting an output of said pattern information to said display means when said decision means has decided that said code information belongs to said control code information.

7. A pattern output apparatus according to claim 6, further comprising character-code-information output means for generating said character code information corresponding to a predetermined bit data within said pattern information in order to output said character code generated by said character-code-information generating means to said read means, when said decision means has decided that said code information belongs to said control code information.

8. A pattern output apparatus according to claim 7, wherein said character-code-information output means comprises character-code-information memory means for storing said character code information corresponding to said predetermined bit data within said pattern information.

9. A pattern output apparatus for outputting pattern information by using memory means for storing a plurality of pattern information comprising:

input means for inputting code information to said apparatus:

read means connected to said input means and to said memory means for reading out said pattern information corresponding to said code information, from said memory means;

judge means connected to said memory means for judging said pattern information read out by said read means and for outputting judgement data; and means for outputting a code, to said read means, indicating that pattern information different from said pattern information read out by said read means should be read out from said memory means.

10. A pattern output apparatus according to claim 9, further comprising display means for displaying said pattern information as an image pattern.

* * * * *

UNITED STATES PATENT AND TRADEMARK OFFICE

CERTIFICATE OF CORRECTION

PATENT NO. : 4,712,188

DATED : December 8, 1987

INVENTOR(S) : MASAKI NISHIYAMA

It is certified that error appears in the above-identified patent and that said Letters Patent is hereby corrected as shown below:

COLUMN 1

Line 58, "is" (second occurrence) should be deleted.
Line 59, "provided" should be deleted.

COLUMN 6

Line 38, "if it is" should be deleted.
Line 45, "selectivelY" should read --selectively--.

COLUMN 7

Line 3, "output output" should read --output--.
Line 5, "discriminatiaon" should read --discrimination--.
Line 24, "contry-code-information" should read --country-code-information--.
Line 27, "contry-designating-data" should read --country-designating-data--.
Line 47, "bit within" should read --bit data within--.

Signed and Sealed this

Twentieth Day of September, 1988

*Attest:*

DONALD J. QUIGG

*Attesting Officer* | *Commissioner of Patents and Trademarks*